United States Patent Office 3,196,375
Patented July 20, 1965

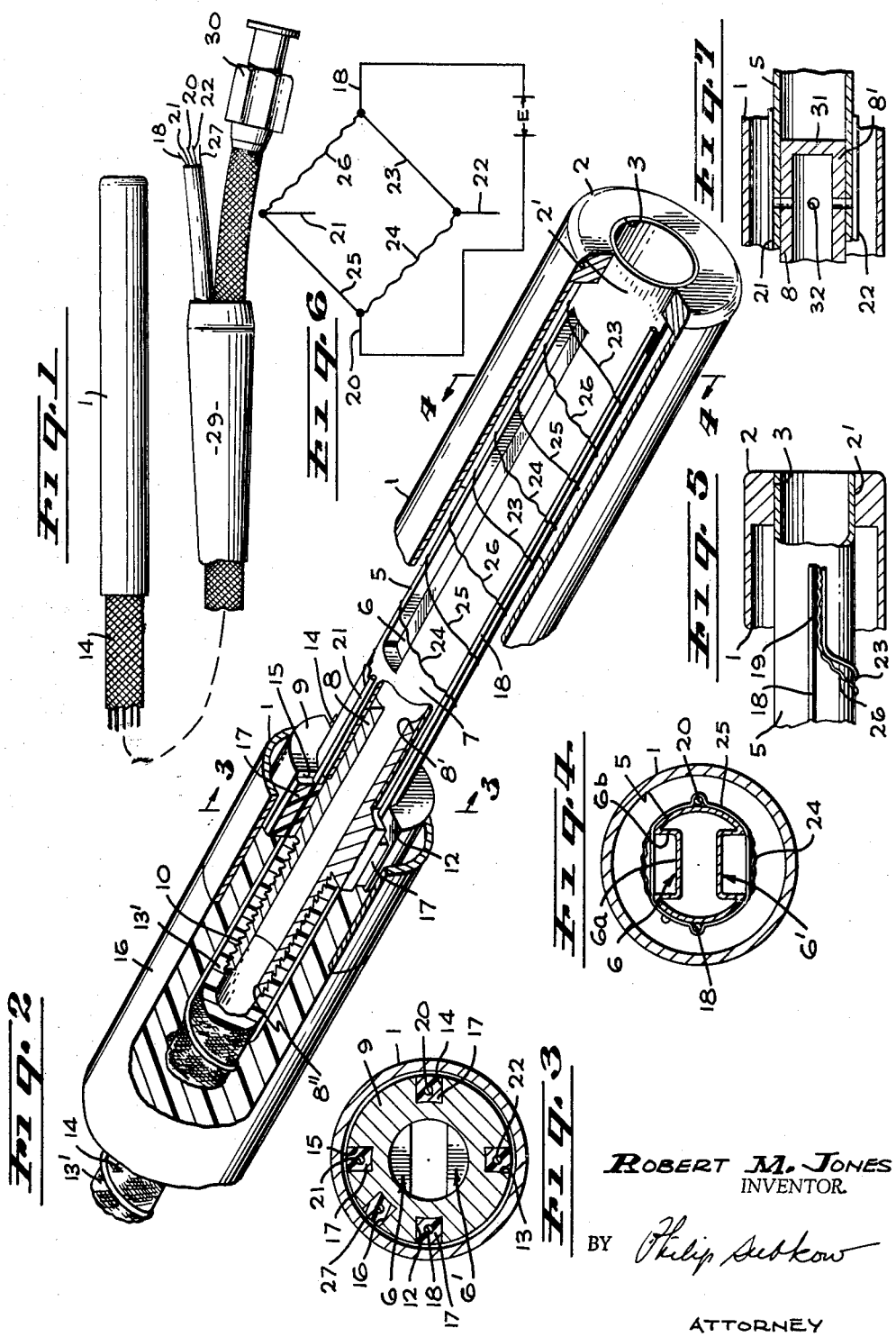

3,196,375
INTRACARDIAC TRANSDUCER
Robert M. Jones, Hato Rey, Puerto Rico, assignor to Statham Laboratories, Inc., Hato Rey, Puerto Rico, a corporation of California
Filed Feb. 10, 1964, Ser. No. 343,851
3 Claims. (Cl. 338—4)

This invention relates to an improvement in the pressure measuring apparatus of the Warnick U.S. Patent No. 2,981,911.

In that patent is described a pressure transducer which may be made suitably small to be used as a pressure gage for measuring pressure of the blood in cardiovascular systems. It is also useful for other pressure measuring services, particularly where a miniaturized gage is desired.

It is an object of this invention to simplify the construction of the device of said patent and to improve its performance.

It is a further object of my invention to improve the temperature stability of the instrument, that is, to produce an instrument which will not give a different signal when subjected to different temperature gradients in the instrument although the pressure does not change.

When only one leg of a Wheatstone bridge is subjected to a change in resistance on application of pressure to the gage, as in the gage of the above patent, with the same excitation voltage, the output voltage for a like change in resistance in the active legs, due to a pressure change, will be one half of that which would be obtained if two of the legs of the bridge were active, i.e., both changed in resistance by the above amount when pressure is applied to the bridge.

Additionally, when two or more resistors, which are connected as adjacent resistors in a Wheatstone bridge, acting as part of a pressure sensing element of a transducer, are exposed to different temperatures, a potential is established across the output corners of the bridge, even though no pressure is applied to change the strain in the active wire legs of the bridge. Thus, the zero balance of the bridge is changed.

My invention improves sensitivity of the gage of the above patent, by permitting a greater voltage change at the output corners of the bridge on like voltage excitation of the bridge and for like pressure change, and it also improves the temperature stability of the gage.

These and other improvements and objects of my invention will be understood by reference to the drawings, of which:

FIG. 1 is a plan view of the device with parts broken away for clearer showing;
FIG. 2 is a perspective and part sectional view;
FIG. 3 is a section on line 3—3 of FIG. 2;
FIG. 4 is a section on line 4—4 of FIG. 2;
FIG. 5 is a fragmentary sectional view; and
FIG. 6 is a schematic wiring diagram of the device.
FIG. 7 is a fragmentary view of a modification of the transducer of FIGS. 1–5.

The pressure gage as shown in FIGS. 1–7 is composed of an outer tube 1 having a reduced end 2 and having a bore of reduced diameter 3. A case in the form of the tube 1 is soldered or welded into position at the end 2, to the coaxially positioned tubular bellows 5, to make a fluid-tight seal. The all metal imperforate bellows tube 5 is formed of thin gage metal, preferably having a low temperature coefficient of expansion such as Invar. It has a cylindrical ungrooved end 2' which fits into the bore 3 to make a fluid tight connection. It has an ungrooved cylindrical end portion 7. Two inwardly extending longitudinally grooves 6 and 6' are positioned diametrically opposite to each other and intermediate the portions 2' and 7.

The grooves extend longitudinally of the tubular member 5 and have a bottom wall 6a and side wall 6b. The bottom walls extend in substantially parallel relationship to each other. The metal wall of the tube 5 and grooves are of a dimension in width and depth and are of shape to permit measurable expansion of the middle portion of the tube at said grooves when a pressure is exerted through 3 as will be further described. The outer surface of tube 5 is coated with a suitable electrically insulating coating of a varnish or synthetic resin.

A tubular connector section 8 makes a sliding close fit into the tube section 7, and carries an integrally formed collar intermediate the inboard end 8' and the outboard end 8" of the tube 8. The tube is threaded at 10 between the outboard end 8" and the collar 9. The exterior of the collar 9 extends radially from the tube 8 and is provided with four slots 12, 13, 14, 15 positioned 90° apart, and a fifth slot 16 is placed between slots 12 and 15. Tube 13', formed of an insulating plastic material such as nylon, is threaded over the thread 10 and is clamped between the threaded end 10 and the plastic sheathing tube 16 and tube 1. Tube 1 is forced over the end of the plastic tube 16 thus clamping the unit into a tight unitary assembly.

A Wheatstone bridge corner electrical connector 18, in the form of a wire, passes through the insulation 17, and positioned in the groove 12 and the inner end of the connector 18 extends over the insulated surface of the tube 5 and terminates at the ungrooved section 2, and is securely anchored at 19, as by an electrically insulating cement.

A like Wheatstone bridge corner electrical connector 20 extends through the insulation 17 and is positioned in groove 14 similarly insulated at 180° from the connector 18. A third Wheatstone bridge corner electrical connector 21 passes through insulation 17 in groove 15 and terminates at the ungrooved portion 7 and is similarly anchored by an insulating cement. A fourth Wheatstone bridge corner connector 22 passes through the insulation 17 in groove 13 and is similarly anchored at 7, 180° from the connector 21. The connectors 18, 20, 21 and 22 are suitably coated with an insulating coating.

Four similar strain sensitive wires, such as are employed in the construction of unbonded strain gages, are wound as described below, in a helically interwound configuration so that they are electrically insulated from each other except at the corners of the Wheatstone bridge, as is herein described.

Wire 23 is electrically connected at one end to the connector 18 and helically wound in tension around the tube 5 and over the groove 6 and 6', and electrically connected at the other end to the connector 22. Wire 26 is also electrically connected to the end of 18 and is helically wound loosely around the tube 2 and electrically connected to the connector 21 at the other end of the wire 26.

Wire 25 is electrically connected at one end to the connector 20 at the section 2, similarly to the connection of 23 to the connector 18, and helically wound in tension equal to the tension in wire 23 around the tube 5 and over the groove 6 and 6' and electrically connected at its other end to the connector 21 at 7. Wire 24 is electrically connected at one end to the connector 20 at 2, similarly to the wire 25, and is helically and loosely wound around the tube 5 and over the groove 6 and 6', and connected to the connector 22 of the section 7.

There are two pairs of bifilar windings, one of the wires of each pair being under tension and the other of the wires in each pair loosely wound, the wires being helically interwound and spaced on the tube 5.

The found connectors 18, 20, 21 and 22 are wound in spiral configuration around the nylon tube 13' and interwoven with nylon thread 14. The entire exterior of the tube 1, and the nylon cord tube 13', and the connectors 18, 20, 21 and 22 are suitably coated with an electrically insulating plastic coating 16. The plastic sheathing tube 16 extends the full length of the tube 13'.

The connectors 18, 20, 21 and 22, at the terminal end, are suitably connected to a recording or other read-out device and a voltage source, as is conventional in Wheatstone bridge strain gage devices.

A fifth electrical insulated conductor 27 soldered in groove 16 and is threaded over the tube 13 and insulated from the wires 18, 20, 21 and 22. (See FIGS. 3 and 4.)

The tube 13' is at its terminal end connected to a fitting 29 through which the wires 18, 20, 21, 22 and 27 pass suitably insulated. The tube 13 passed through the fitting 29 to a terminal fitting 30. The connectors 18, 20, 21, 22 and 27 pass to suitable recording or measuring devices.

Blood may be sampled by passage through the bore 3, tube 13 and fitting 30. Also, liquid may be introduced into the fitting 30 to pass through 13 and from the bore 3 into the blood stream.

When the fluid pressure enters 3 and this pressure is greater than existing in the space between 5 and 1, it causes expansion of the tube 5 at the grooves 6 and 6', causing a separation in the walls of the grooves, with a consequent increase in the perimeter of the tube at the wires. The sections 2 and 7 are not appreciably expanded, and may thus be said to be relatively rigid as compared to the grooved section. The expansion of the grooved section causes an increase in the tension of the wires 25 and 23. The tube 5 thus acts as the pressure sensing means. The wires 26 and 24, being loosely wound and thus under no tension on assembly, are not, because of this expansion, placed in tension. The wires are adjusted in length so as to be in electrical balance when they are wound. Balancing and compensating resistors may be used as is conventional for Wheatstone bridge configurations.

If a potential is impressed between 18 and 20, substantially no potential appears between the connectors 21 and 22 when the pressures on both sides of the tube 5 are equal. However, when a pressure is impressed through 3 into the interior of the tube 5, the resistance of the wires 23 and 25 is increased, while the resistance of the wires 24 and 26 is unchanged. Thus, when a potential E (see FIG. 6) is impressed between 18 and 20, a potential appears between 21 and 22 which is in magnitude proportional to the pressure in 3. The Wheatstone bridge forms part of the readout means active with the tube 5 to transduce the pressure into a proportional electrical signal.

The gage of my invention is not only simple to construct but has the advantage that it has a larger potential output from the bridge for a like pressure in 3 than will appear if only one of the legs of the Wheatstone bridge is active, i.e., if only one wire 23 or 25 were used under tension and has its resistance changed with variations in pressure. The bridge of the gage described above is a Wheatstone bridge with two active wires.

Another important advantage of the construction of my invention is that it has a zero which is less sensitive to temperature changes. Since all of the wires of the bridge are placed closely adjacent to each other over the tube 5, all four arms of the bridge are subject to the same variation in temperature. They all have a like change in resistance when subjected to temperature variations.

Temperature gradients may exist in the transducer. Thus, current passing through the wires when energized, heat the wires. Additionally, fluid passing through the tube 5 as for example, when blood is withdrawn through 5 or fluid is introduced through 5 as described above, will establish a temperature gradient between the ends of the tubular bellows 5.

If such temperature gradients affect adjacent legs of the bridge differently, a bridge imbalance is obtained which is unrelated to the pressure existing in the tubular bellows. A spurious signal is thus produced.

In the construction of my invention, all wires are equally effected by temperature gradients and the effect of temperature gradients thus cancel out. Thus, when pressure is exerted in 3, at some other temperature other than that at which the transducer was calibrated, the change in resistance to the wires of the bridge will give an output proportional to pressure; and the effect of temperature on the resistance of the wires 23, 24, 25 and 26 will cancel out so not to effect the output of the bridge. It is thus thus said to have a temperature stable zero.

Further, if a fluid at a temperature different from the blood temperature is introduced through 30, the temperature at the end of the tube 5 adjacent the tube 8 may be less than that at the outlet 3. But since all of the wires of the bridge are subjected to the same temperature environment, these effects cancel out.

The provisions of the grounded wire 27 convert the transducer itno an electrode. It may be connected independently of the Wheatstone bridge to a second device to measure potentials or for any purposes for which electrodes may be desired to be inserted into the blood stream.

In the construction described above, and illustrated in FIGS. 1–5, the pressure in the space between the case 1 and the tubular bellows 5 may be any desired pressure or vacuum as is established at the time the system is assembled. For example, it may be atmospheric pressure existing at the time, placed and temperature of the assembly locality or at the chosen subatmospheric pressure.

When the transducer is inserted into the blood stream, it becomes subjected to a temperature which may be higher or lower than the temperature at which it is assembled. Some change in pressure may occur in the space exteriorly of the tubular bellows 5. Further, the unit may be employed to determine blood pressure changes occurring during tests, and any variations in pressure in the exterior space would not introduce substantial errors in the determination of such pressure changes.

Where it is desired to know or control the pressure in the space exteriorly of the tubular bellows 5, the modification of the unit of FIGS. 1–5 shown in FIG. 7 may be used. This modification permits establishing a pressure in the space above the bellows 5 which may be any pressure desired.

The structure shown in FIGS. 1–6 is modified in that the tube 8 is sealed at its end 8' by a barrier wall 31 and the tube 8 and tubular bellows 5 adjacent thereto, is bored with bores 32 to connect the space exteriorly of the tubular bellows 5 and the interior of the tubular section 8. It will be seen that the pressure in the exterior space about the tubular bellows 5, communicates with, and is at the pressure existing as the terminal end of the filling 30. This may be atmospheric or any pressure in a space to which 30 may be connected. Thus, the pressure in the interior of the tubular bellows is referenced against a known and determinable pressure existing exteriorly of the tubular bellows 5.

While I have described particular embodiments of my invention for the purpose of illustration, it should be understood that various modifications and adaptations thereof may be made within the spirit of the invention, as set forth in the appended claims.

I claim:

1. A pressure transducer comprising an elongated tubular member having an expansible tubular section and relatively rigid tubular portions at each end of the expansible section, a collar extending radially adjacent to one of said relatively rigid portions, four angularly spaced slots in said collar positioned axially of said collar, four Wheatstone bridge electrical connectors passing through said four slots, two of said connections terminating at one of said relatively rigid portions and two of said connectors terminating at the other of said relatively rigid portions, two pair of wires helically wound around said expansible tubular sections, one of the wires of each pair wound under tension and the other loosely wound around said expansible tubular section, the said pairs being connected to said connectors in a Wheatstone bridge arrangement, adjacent wires of said bridge being composed of one wire wound under tension and one wire loosely wound, a tubular case connected at one end to one of said relatively rigid portions and at the other end of said case to the other of said relatively rigid portions, said case spaced from the expansible section.

2. A pressure transducer comprising an all-metal imperforate thin walled hollow cylinder having end portions and a middle portion, the middle portion of the wall having a portion displaced inwardly to form a longitudinal inwardly extending grooved central portion and two ungrooved end portions, the wall and groove being so dimensioned and shaped as to permit measurable expansion of said middle portion in response to slight pressure variations within the cylinder, a tubular connector having a radially extending collar positioned intermediate the ends of said connector, said collar having a plurality of angularly separated slots, one of said ungrooved end portions of said all-metal hollow cylinder being fitted over one end of said connector, a tubular case positioned in spaced coaxial relation with respect of said grooved portion of said all-metal hollow cylinder, said case having an end portion in fluid tight connection with one of said ungrooved portions of said all-metal hollow cylinder and said case being affixed to the other ungrooved portion of said all-metal hollow cylinder, four Wheatstone bridge electrical connectors, one each passing through and insulated from one each of said grooves in said collar, two of said electrical connectors terminating at one of said ungrooved portions of said all-metal hollow cylinder, and two of said electrical connectors terminating at the other of the ungrooved portions of the all-metal hollow cylinder, two pair of wires helically wound around said grooved portion of said all-metal hollow cylinder, one of the wires of each pair wound under tension and the other wire of each pair loosely wound around said grooved portion of said all-metal hollow cylinder, said pairs of wires being connected to said electrical connectors in a Wheatstone bridge arrangement, adjacent wires of said bridge being composed of one wire wound under tension and one wire loosely wound, said wires and said electrical connectors being insulated from said first-mentioned connector, case and all-metal hollow cylinder.

3. In the transducer of claim 2, said grooved portion of said all-metal thin walled hollow cylinder comprising inwardly extending wall portions forming a pair of opposed longitudinally and inwardly extending grooves, each of said grooves having a bottom wall, said bottom walls being disposed in substantially parallel relationship, the wall of said all-metal hollow cylinder and grooves being dimensioned and shaped as to permit measurable expansion of said grooved portion in response to slight pressure variations within the all-metal hollow cylinder.

References Cited by the Examiner

UNITED STATES PATENTS

| | | | |
|---|---|---|---|
| 2,059,549 | 11/36 | Carlson | 338—4 X |
| 2,641,131 | 6/53 | Waugh | 338—4 X |
| 2,933,706 | 4/60 | De Stefano | 338—36 X |
| 2,981,911 | 4/61 | Warnick | 338—4 |

RICHARD M. WOOD, *Primary Examiner.*